United States Patent
Homan et al.

(12) 
(10) Patent No.: US 7,222,666 B2
(45) Date of Patent: May 29, 2007

(54) VEHICLE AIR-CONDITIONING APPARATUS THAT CAN SURELY DEFOG WINDOW

(75) Inventors: Toshinobu Homan, Obu (JP); Hiroshi Kishita, Anjo (JP)

(73) Assignee: DENSO Corporation, Kariya (JP)

( * ) Notice: Subject to any disclaimer, the term of this patent is extended or adjusted under 35 U.S.C. 154(b) by 402 days.

(21) Appl. No.: 10/690,154

(22) Filed: Oct. 21, 2003

(65) Prior Publication Data

US 2004/0083748 A1 May 6, 2004

(30) Foreign Application Priority Data

Oct. 22, 2002 (JP) ............................ 2002-306552

(51) Int. Cl.
*F25D 17/08* (2006.01)
*B60H 1/00* (2006.01)
*B60H 3/00* (2006.01)
*F25B 29/00* (2006.01)

(52) U.S. Cl. .................. 165/202; 165/222; 165/224; 165/225; 62/161; 62/162; 62/163; 62/164; 62/176.3; 62/176.6; 62/176.1; 475/75

(58) Field of Classification Search ............. 165/202, 165/224, 225, 222; 62/161, 162, 163, 164, 62/176.3, 176.6; 475/75
See application file for complete search history.

(56) References Cited

U.S. PATENT DOCUMENTS 4,794,537 A * 12/1988 Adasek et al. ................ 237/5
4,910,967 A * 3/1990 Takahashi ..................... 62/161
4,917,293 A * 4/1990 Fedter et al. ................ 165/224
2001/0010261 A1 8/2001 Oomura et al.

FOREIGN PATENT DOCUMENTS

JP 7-179120 7/1995

* cited by examiner

*Primary Examiner*—John K. Ford
(74) *Attorney, Agent, or Firm*—Harness, Dickey & Pierce, PLC

(57) ABSTRACT

A vehicle air-conditioning apparatus includes a dehumidification means, which has a compressor and dehumidifies inside of the vehicle, a humidity calculation means, which calculates humidity in the vicinity of an inside surface of the windshield, and a determination means, which determines whether the windshield is fogged on the basis of comparison between the humidity and a predetermined value. A defogging operation for heightening dehumidifying performance of the dehumidification means is performed, when the determination means determines that the windshield is fogged in a state where the compressor is turned on. The dehumidifying performance of the dehumidification means is lowered or condition in which the defogging operation is started is made to be difficult in the next defogging operation, when the windshield is determined to be fogged and the defogging operation is not manually performed in a state where the compressor is turned off.

4 Claims, 6 Drawing Sheets

VEHICLE AIR-CONDITIONING APPARATUS THAT CAN SURELY DEFOG WINDOW

CROSS REFERENCE TO RELATED APPLICATION

This application is based on Japanese Patent Application No. 2002-306552 filed on Oct. 22, 2002, the disclosure of which is incorporated herein by reference.

FIELD OF THE INVENTION

The present invention relates to a vehicle air-conditioning apparatus, and more particularly to a vehicle air-conditioning apparatus which activates its defogging system when the window of the vehicle is considered to become fogged in a state where an activation switch of a compressor is turned on.

BACKGROUND OF THE INVENTION

A conventional vehicle air-conditioning apparatus is described, for example, in JP-A-2001-213152. This vehicle air-conditioning apparatus has a humidity sensor for detecting relative humidity in a passenger compartment. The vehicle air-conditioning apparatus calculates humidity in the vicinity of the inner surface of a vehicle window through the use of the value detected by the humidity sensor. Moreover, on the basis of the calculated humidity, it is determined whether the vehicle window becomes fogged or not. When determined to become fogged, its defogging system is activated so as to defog the vehicle window, e.g., its evaporator is driven more actively so as to heighten its dehumidifying performance.

However, in this vehicle air-conditioning apparatus, the humidity sensor is likely to incorrectly detect the relative humidity in the passenger compartment. When the humidity sensor detects the value of the relative humidity more highly than its true value, the vehicle window is erroneously determined to be fogged. Accordingly, the defogging system is unnecessarily and wastefully driven. Otherwise, when the humidity sensor detects the value of the relative humidity lower than its true value, the vehicle window is erroneously determined not to be fogged. Accordingly, the vehicle window disadvantageously becomes fogged.

SUMMARY OF THE INVENTION

In view of the foregoing problems, the purpose of the present invention is to provide a vehicle air-conditioning apparatus that can surely defog a vehicle window without unnecessarily being driven even though its humidity sensor incorrectly detects relative humidity in the passenger compartment.

According to the invention, a vehicle air-conditioning apparatus includes a dehumidification means, which has a compressor and dehumidifies inside of the vehicle, a humidity calculation means, which calculates humidity in the vicinity of an inside surface of the windshield, and a determination means, which determines whether the windshield is fogged on the basis of comparison between the humidity and a predetermined value. A defogging operation for heightening dehumidifying performance of the dehumidification means is performed, when the determination means determines that the windshield is fogged in a state where the compressor is turned on. The dehumidifying performance of the dehumidification means is lowered or condition in which the defogging operation is started is made to be difficult in the next defogging operation, when the windshield is determined to be fogged and the defogging operation is not manually performed in a state where the compressor is turned off.

Therefore, the dehumidification means is prevented from being unnecessarily activated.

Moreover, according to the invention, a vehicle air-conditioning apparatus includes a dehumidification means, which has a compressor and dehumidifies inside of the vehicle, a humidity calculation means, which calculates humidity in the vicinity of an inside surface of the windshield, and a determination means, which determines whether the windshield is fogged on the basis of comparison between the humidity and a predetermined value. A defogging operation for heightening dehumidifying performance of the dehumidification means is performed, when the determination means determines that the windshield is fogged in a state where the compressor is turned on. The dehumidifying performance of the dehumidification means is heightened or condition in which the defogging operation is started is made to be easy in the next defogging operation, when the windshield is determined to be fogged and the defogging operation is not manually performed in a state where the compressor is turned on.

Therefore, the windshield can be surely defogged when fogged.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE PRESENTLY PREFERRED EMBODIMENTS

The embodiment of the present invention will be described in detail with reference to the accompanying drawings.

Figure 1:
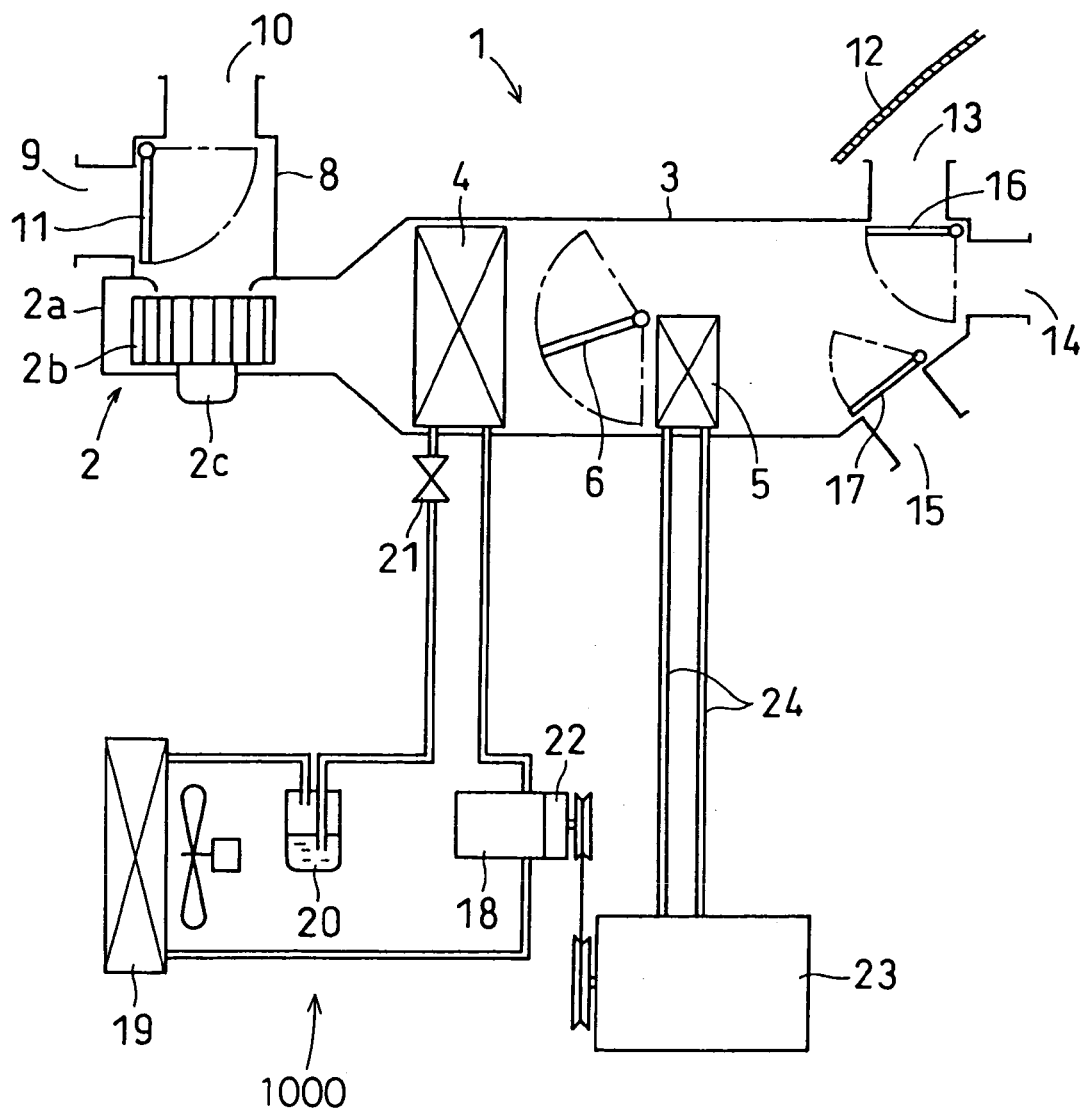
FIG. 1 is a schematic diagram of a vehicle air-conditioning apparatus according to the present invention.

As shown in FIG. 1, a vehicle air-conditioning apparatus 1 has an air blower unit 2, an air duct 3, an evaporator 4, a heater core 5 and an air mix door 6. The air blower unit 2 produces airflow. The air duct 3 introduces air from the air blower unit 2 into a passenger compartment (not shown). The evaporator 4 is disposed inside the duct 3. The heater core 5 is disposed inside the air duct 3 downstream from the evaporator 4. Moreover, the vehicle air-conditioning apparatus 1 is automatically controlled by an ECU 7 (shown in FIG. 2), and thereby the temperature in the passenger compartment can be kept to be preset temperature.

The air blower unit 2 includes a casing 2a, a centrifugal fan 2b and a motor 2c. The casing 2a is formed integrally with an air switching unit 8. The centrifugal fan 2b is disposed inside the casing 2a. The motor 2c rotatably drives the blower fan 2b. The air switching unit 8 has an inside-air intake opening 9, an outside-air intake opening 10 and a switching door 11. Through the inside-air intake opening 9, the air in the passenger compartment is drawn into the air switching unit 8. Through the outside-air intake opening 10, the outside air is drawn into the air switching unit 8. The switching door 11 controls the opening degrees of the air intake openings 9, 10.

In the air duct 3, a defroster air outlet 13, a face air outlet 14, a foot air outlet 15, a def-face switching door 16 and a foot door 17 are provided. From the defroster air outlet 13, conditioned air is blown toward a windshield 12. From the face air outlet 14, the conditioned air is blown toward the upper body of a passenger. From the foot air outlet 15, the conditioned air is blown toward the feet of the passenger. The def-face switching door 16 controls the opening degrees of the defroster air outlet 13 and the face air outlet 14. The foot door 17 controls the opening degree of the foot air outlet 15.

The evaporator 4 is one of main components of a refrigeration cycle 1000 (a dehumidification means) of the vehicle air-conditioning apparatus 4. In the evaporator 4, while low-temperature refrigerant flows inside the evaporator 4, the refrigerant is heated by ambient air around the evaporator 4 and is thereby vaporized. Then, the ambient air is cooled and circulated. The refrigeration cycle 1000 is essentially composed of a compressor 18, a condenser 19, a receiver 20 and the evaporator 4. The compressor 18 is driven by an engine 23 through an electromagnetic clutch 22.

The heater core 5 is a heat exchanger, which heats its ambient air passing through the air duct 3 with the use of the heat of coolant from the engine 23. The heater core 5 is communicated with the engine 23 by way of coolant tubes 24. The air mix door 6 controls the amount of air passing through the heater core 5 and the amount of air bypassing the heater core 5, and thereby the temperature of the air blown toward the passenger compartment is controlled.

An ECU 7 (shown in FIG. 2) is an electric control unit employing a microcomputer (not shown) and is activated when the ignition switch (not shown) is turned on. The ECU 7 controls the vehicle air-conditioning apparatus 1 (e.g., the doors 6, 11, 16, 17, the blower unit 2, the compressor 18) on the basis of operation signals from a control panel 25 (shown in FIG. 3) and sensor signals from sensors devices 34–40 (shown in FIG. 2).

Figure 3:
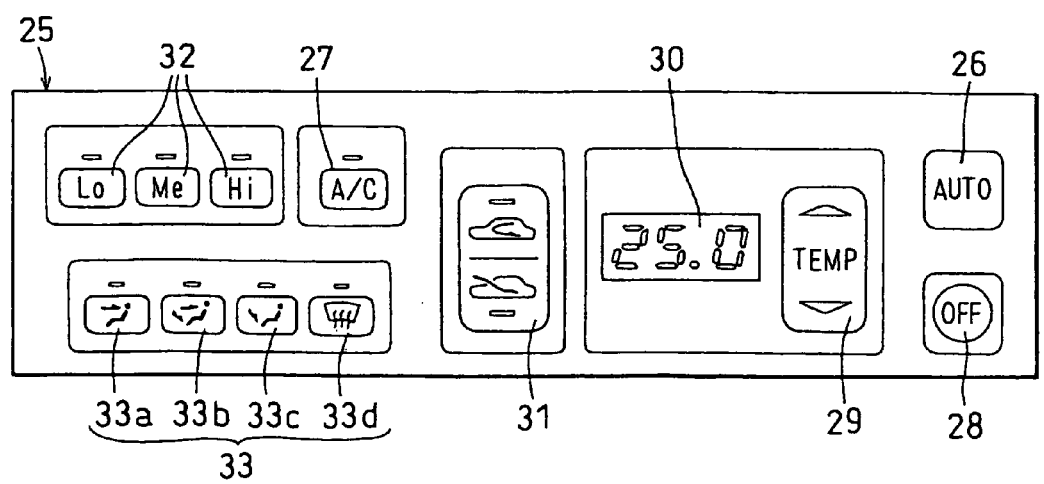
FIG. 3 is a front elevational view of a control panel of the vehicle air-conditioning apparatus.

As shown in FIG. 3, the control panel 25 is provided with an AUTO switch 26, an A/C switch 27, an OFF switch 28, a temperature set switch 29, a set temperature display 30, an air inlet mode selector 31, a blowing level selector 32 and a blowing mode selector 33.

While the AUTO switch 26 is turned on, the ECU 7 is instructed to automatically control the vehicle air-conditioning apparatus 1. The A/C switch 27 is an on/off switch for turning the compressor 18 on or off. The OFF switch 28 is a switch for turning off the ECU 7. The temperature set switch 29 is a switch for configuring a set temperature, which is a desired value of the temperature in the passenger compartment. The set temperature display 30 is a digital display for indicating the set temperature configured by the temperature set switch 29.

The air inlet mode selector 31 is a switch for switching between two air inlet modes. In detail, one of the air inlet modes is an outside mode, in which the outside air is introduced from the outside-air intake opening 10, and the other one is an inside mode, in which the inside air is introduced from the inside-air intake opening 9.

Through the use of the blowing level selector 32, the blowing level of the air blown by the air blower unit 2, i.e., the air blown into the passenger compartment can be selected from high blowing level (Hi), middle blowing level (Me) and low blowing level (Lo).

The blowing mode selector 33 has a face mode switch 33a for opening the face air outlet 14, a face-foot mode switch 33b for opening the face and foot air outlets 14, 15, a foot mode switch 33c for opening the foot air outlet 15 and a defroster mode switch 33d for opening the defroster air outlet 13.

Figure 2:
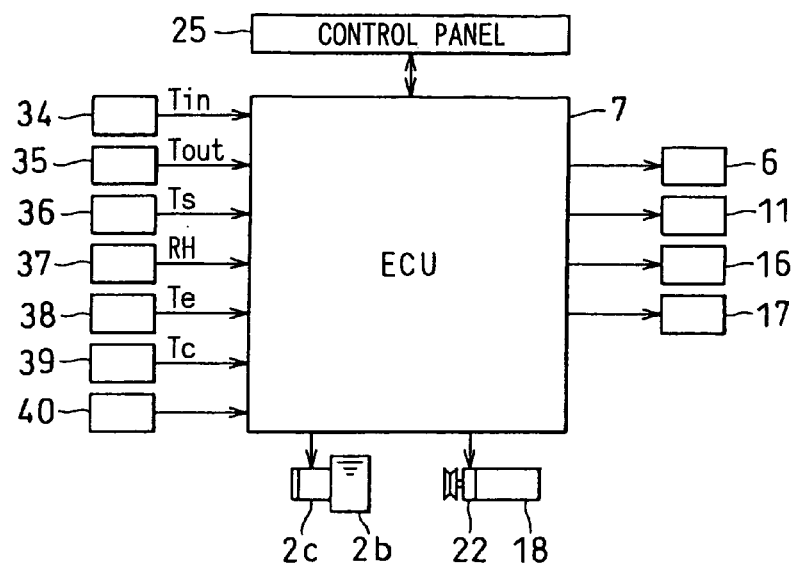
FIG. 2 is a schematic diagram of a control system of the vehicle air-conditioning apparatus.

Regarding the sensor devices, as shown in FIG. 2, an inside temperature sensor 34, an outside temperature sensor 35, a sunlight sensor 36, a humidity sensor 37, an evaporator temperature sensor 38, a coolant temperature sensor 39 and a potential sensor 40 are provided. The inside temperature sensor 34 detects the temperature in the passenger compartment (Tin). The outside temperature sensor 35 detects the temperature of the outside (Tout). The sunlight sensor 36 detects the amount of solar radiation (Ts). The humidity sensor 37 senses relative humidity in the passenger compartment (RH). The evaporator air temperature sensor 38 detects the temperature of the air cooled by the evaporator 4 (Te). The coolant sensor 39 detects the temperature of the coolant (Tc). The potential meter 40 detects the position of the air mix door 6.

Figure 4:
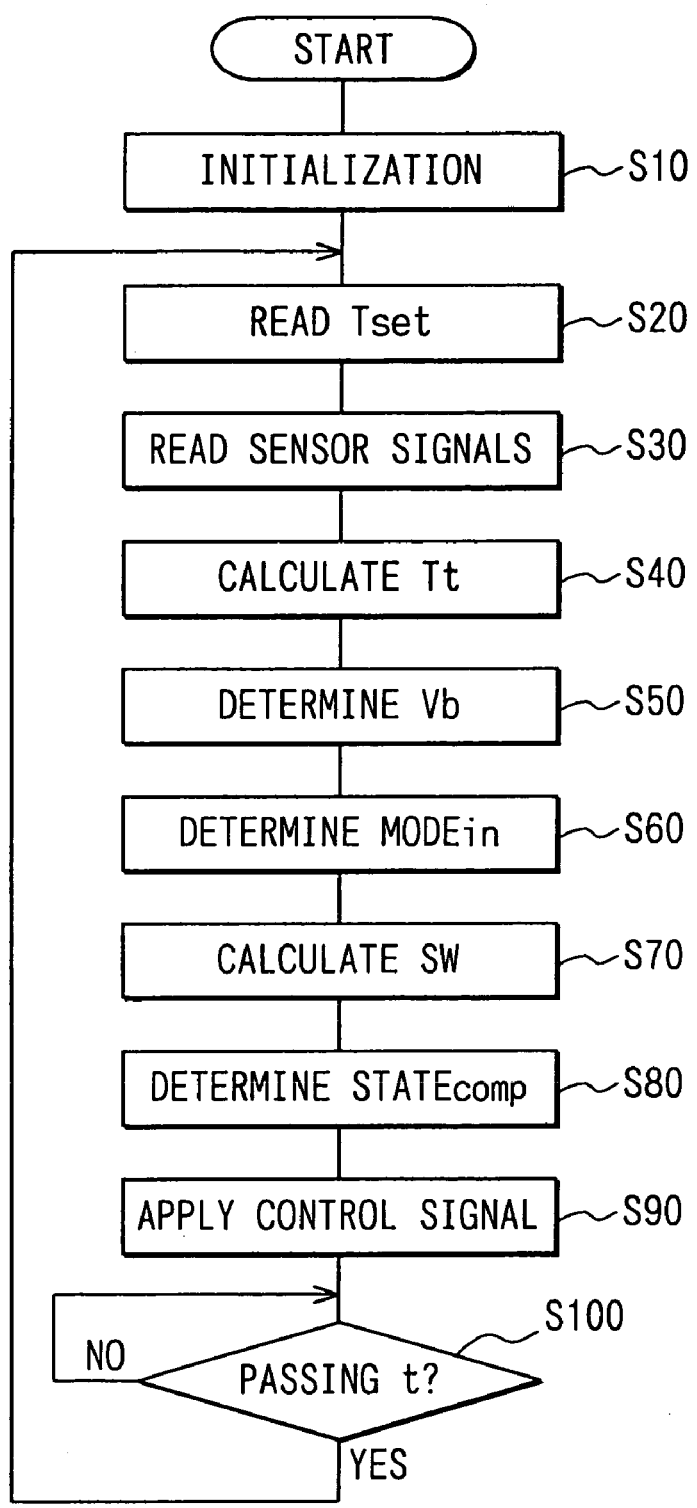
FIG. 4 is a flow chart showing the steps performed in conditioning air by the vehicle air-conditioning apparatus.

Herein after, the control procedure of the ECU 7 will be described with reference to a flow chart shown in FIG. 4.

At step S10, counters and flags used for controlling the vehicle air-conditioning apparatus 1 are initialized.

At step S20, set temperature Tset configured by the temperature set switch 29 is read.

At step S30, the sensor signals output from the sensor devices (e.g., Tin, Tout, Ts, RH, Te and Tc) are read.

At step S40, target blow temperature Tt, which is temperature of air to be blown into the passenger compartment, is calculated on the basis of the following formula (1), $$Tt = Kset \times Tset - Kin \times Tin - Kout \times Tout - Ks \times Ts + C \tag{1}$$

in which Kset is a set temperature coefficient, Kin is an inside temperature coefficient, Kout is an outside temperature coefficient, Ks is a sunlight coefficient and C is a correction coefficient.

At step S50, a blower voltage Vb to be applied to the blower motor 2c is determined correspondingly to Tt on the basis of a blower characteristic graph (not shown) previously memorized in a ROM (not shown).

At step S60, an air inlet mode MODE in corresponding to Tt is determined on the basis of an air-inlet characteristic graph previously memorized in the ROM.

At step S70, a target position SW of the air mix door 6 is calculated on the basis of the following formula (2), $$SW = \{(Tt - Te) \div (Tc - Te)\} \times 100(\%) \tag{2}$$

At step S80, the ON/OFF state of the compressor 18 (STATEcomp) is determined on the basis of a target evaporator temperature Tte, which is the target temperature of air to be cooled by the evaporator 4. This step relates to defogging process of this invention, which will be described later.

At step S90, control signals are applied to control devices, such as a servo motor and a drive circuit (not shown), to attain each target value determined at the steps S50–S80.

At step S100, the ECU 7 waits for a predetermined period t, and thereafter the steps S20–S100 are repeated.

Hereinafter, the process of the step S80 will be described in detail. While each of following operations (a)–(c) is performed, the ECU 7 calculates Tte, (a) temperature control operation for controlling the temperature of the air in the passenger compartment, (b) humidity control operation for controlling the humidity of the air in the passenger compartment so as to be within a comfortable range, and (c) defogging operation for preventing the windshield 12 from being fogged.

The smallest one of the Tte values calculated in the above operations (a)–(c) is determined as the final Tte. On the basis of the final Tte, the ON/OFF state of the compressor 18 is determined.

Figure 5:
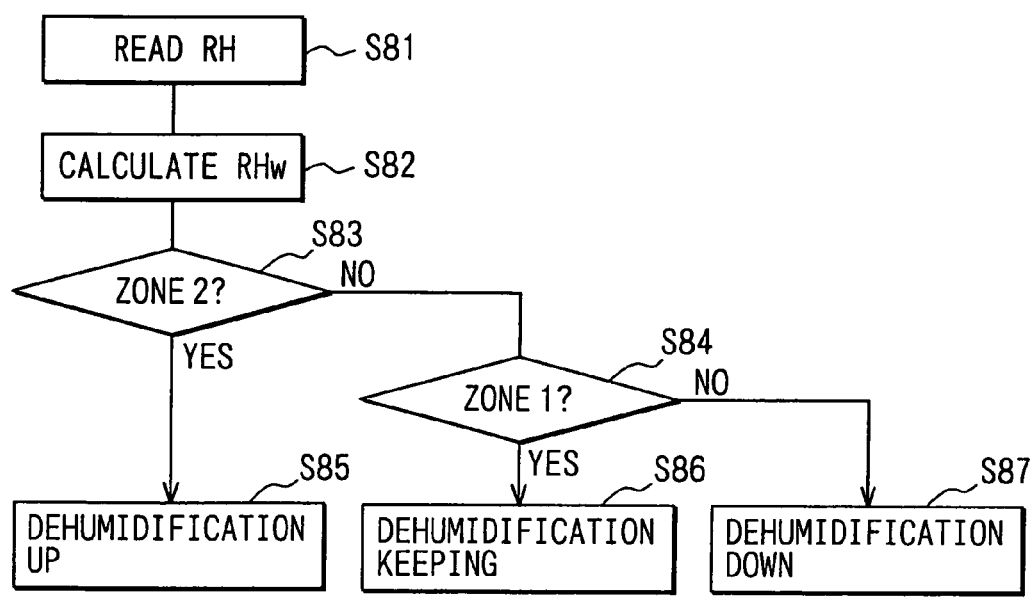
FIG. 5 is a flow chart showing the steps performed in defogging by the vehicle air-conditioning apparatus.

Hereinafter, the defogging operation according to this invention will be described with reference to a flow chart shown in FIG. 5.

At step S81, the ECU 7 reads a sensor signal having a data of RH from the humidity sensor 37.

At step S82, the ECU 7 calculates the humidity in the vicinity of the inner surface of the windshield 12 RHw on the basis of the read RH. The formula for calculating RHw is explained, for example, in Jp-A-2001-213152.

Figure 6:
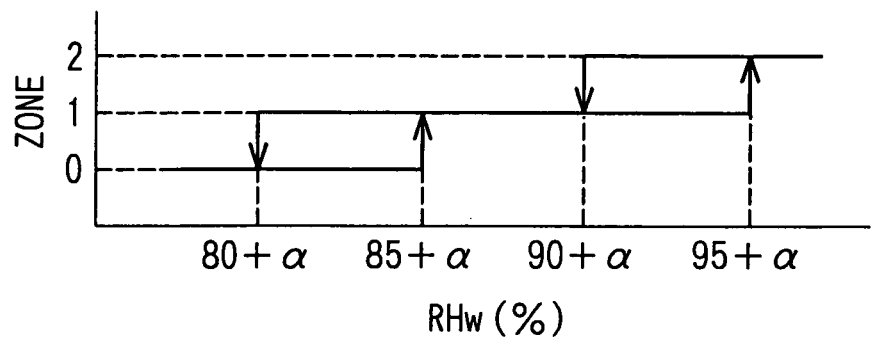
FIG. 6 is a first zone map with respect to defogging process by a vehicle air-conditioning apparatus according to the first embodiment of the present invention.

At step S83, on the basis of a zone map (shown in FIG. 6) previously memorized in the ROM, it is determined whether RHw enters a zone 2 or not. When RHw is determined not to enter the zone 2 (NO), the next step is step S84. Otherwise, when RHw is determined to enter the zone 2 (YES), the next step is step S85. As shown in FIG. 6, there are three zones (i.e., a zone 0, a zone 1 and the zone 2). The zone 0 is a low humidity zone. The zone 1 is a middle humidity zone. The zone 2 is a high humidity zone.

At step S84, on the basis of the zone map, it is determined whether RHw enters the zone 1 (YES) or not (NO). When detected as YES, the next step is step S86. Otherwise, when detected as NO, the next step is step S87.

At step S85, Tte is offset to be low, and thereby the dehumidifying performance of the evaporator 4 is heightened, i.e., the period in which the compressor is turned on is lengthened.

At step S86, Tte is not changed, and the dehumidifying performance of the evaporator 4 is kept.

At step S87, Tte is offset to be high, and thereby the dehumidifying performance of the evaporator 4 is lowered.

Hereinafter, a procedure for offsetting the zone of RHw determined on the basis of RH detected by the humidity sensor 37 through the use of the zone map will be explained.

(First Embodiment)

In cases where both of the AUTO switch 26 and the A/C switch 27 are turned off, when the windshield 12 is determined to be fogged, i.e., when the humidity RHw calculated at the step 82 enters the zone 2, and moreover, for example, the defroster mode switch 33d is not turned on, this offsetting is performed. The determining process of the zone of RHw is performed at a predetermined cycle irrespective of the ON/OFF states of the AUTO switch 26 and the A/C switch 27 while the ECU 7 is turned on.

Figure 7:
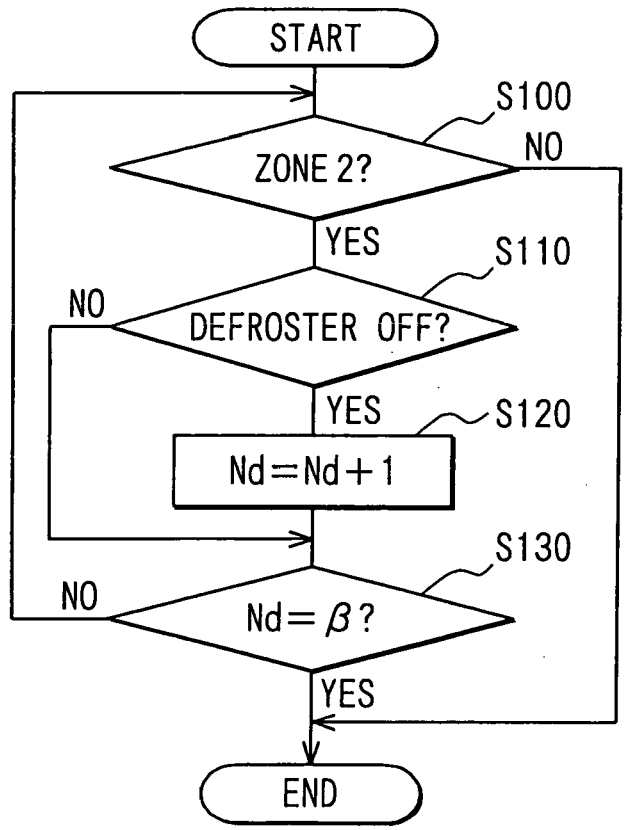
FIG. 7 is a flowchart showing the steps in offsetting calculated humidity on the basis of the first zone map.

FIG. 7 is a flow chart showing a procedure for offsetting the zone of RHw determined on the basis of the zone map. This procedure is preformed in a state where both of the AUTO switch 26 and the A/C switch 27 are turned off.

At step S100, it is determined whether RHw calculated at step S82 enters the zone 2 (YES) or not (NO). When determined as YES, the next step is step S110. Otherwise, when determined as NO, the procedure finishes.

At step S110, it is determined whether the defroster mode switch 33d is turned off (YES) or on (NO). When determined as YES, the next step is step S120. Otherwise, when determined as NO, the next is step S130.

The ECU 7 has a defroster counter (not shown) for counting the number of times that the defroster mode switch 33 (Nd) is not turned on. At step S120, one is added to Nd. Moreover, RHw is offset to be RHw+α (i.e., RHw=RHw+α), in which α is a coefficient.

At step S130, it is determined whether Nd is equal to a predetermined number β (YES) or not (NO). When determined as YES, this procedure finishes. Otherwise, when determined as NO, the next step is returned to the step S100 and the steps S100–S130 are repeated.

Hereinafter, the effect of the first embodiment will be described. In a state where both of the AUTO switch 26 and the A/C switch 27 are turned off, when the ECU 7 determines that the windshield 12 is fogged and moreover the passenger does not manually turn on the defroster mode switch 33d, it is considered that the ECU 7 determines RHw lower than its actual value.

Therefore, when the ECU 7 determines that the windshield 12 is fogged and moreover the passenger does not manually turn on the defroster mode switch 33d, RHw is offset to be higher (i.e., RHw =RHw+α). Accordingly, the extra activation of the evaporator 4 can be prevented while the windshield 12 is not fogged. That is, the extra power for driving the compressor 18 can be reduced.

(Second Embodiment)

In the second embodiment, components similar to those described in the first embodiment will be indicated by the similar numerals, and thus will not be described farther.

Figure 8:
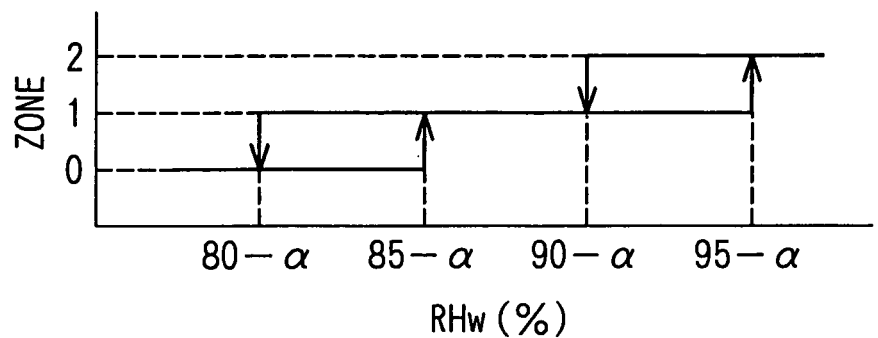
FIG. 8 is a second zone map with respect to defogging process by a vehicle air-conditioning apparatus according to the second embodiment of the present invention.

In this embodiment, RHw is offset on the basis on a zone map shown in FIG. 8. In a state where either the AUTO switch 26 or the A/C switch 27 is turned on, when the ECU 7 determines that the windshield 12 is not fogged, i.e., RHw calculated at the step S82 enters the zones 0 or 1 and moreover the passenger does not turn on the defroster mode switch 33d, this offsetting is performed.

Figure 9:
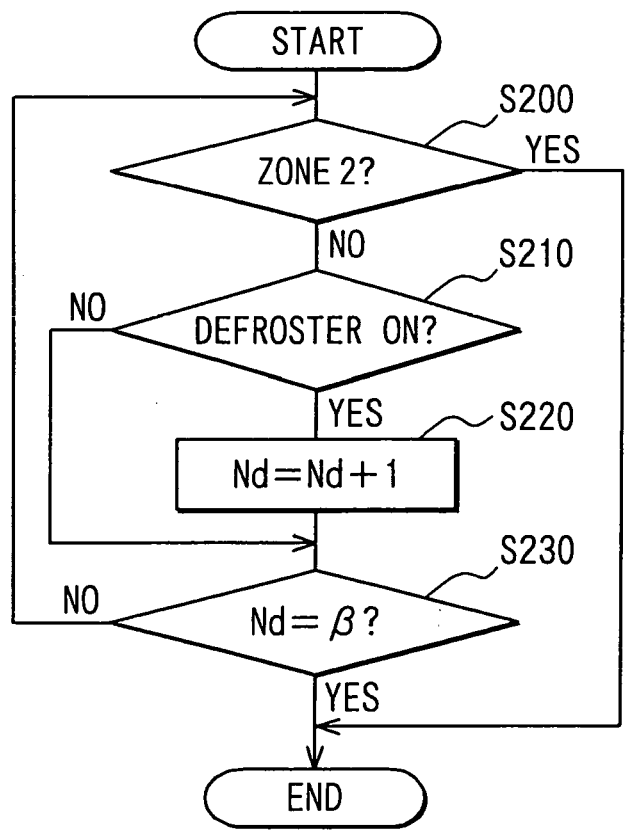
FIG. 9 is a flowchart showing the steps in offsetting calculated humidity on the basis of the second zone map.

FIG. 9 is a flow chart showing a procedure for offsetting the zone of RHw determined on the basis of the zone map shown in FIG. 6. This procedure is performed in a state where either the AUTO switch 26 or the A/C switch 27 is turned on.

At step S200, it is determined whether RHw calculated at the step S82 enters the zone 2 or not. When determined as NO, the next step is step S210. Otherwise, when determined as YES, the procedure finishes.

At step S210, it is determined whether the defroster mode switch 33d is turned on (YES) or off (NO). When determined as YES, the next step is step S220. Otherwise, when determined as NO, the next step is step S230.

At step S220, one is added to Nd of the defroster counter. Moreover, RHw is offset to be RHw−α (i.e., RHw=RHw−α).

At step S230, it is determined whether Nd is equal to β (YES) or not (NO). When determined as YES, this procedure finishes. Otherwise, when determined as NO, the next step is returned to the step S200 and the steps S200–S230 are repeated.

Hereinafter, the effect of the second embodiment will be explained. In a state where either the AUTO switch 26 or the A/C switch 27 is turned on, when the ECU 7 determines the windshield 12 is not fogged and moreover the passenger turns on the defroster mode switch 33d, it is considered that the ECU 7 determines RHw higher than its actual value.

Therefore, when the ECU 7 determines that the windshield 12 is not fogged and moreover the passenger turns on the defroster mode switch 33d, RHw is offset to be lower (i.e. RHw=RHw−α). Accordingly, the evaporator 4 can be surely activated when the windshield 12 is fogged. That is, the defogging operation can be performed when the windshield 12 is fogged.

(Modifications)

In the above described embodiments, the defroster mode switch 33d must be turned on in order to manually defog the windshield 12. Otherwise, following operations (a)–(d) may be performed for defogging.
(a) Either the AUTO switch 26 or the A/C switch 27 is turned on (in the first embodiment).
(b) A door window or a sun roof is opened.
(c) The air inlet mode is changed to be the outside mode.
(d) When the vehicle has a heating apparatus near the windshield 12, the heating apparatus is turned on.

flowchart showing a procedure for offsetting the zone of RHw determined on the basis of the zone map.

Moreover, in the above embodiments, the zone of RHw determined on the basis of the zone map is offset. Otherwise, RH detected by the temperature sensor 37 or the Tte may be offset. In this connection, RH should offset to be lower in the first embodiment, and RH should be offset higher in the second embodiment. Moreover, Tte should be offset to be higher so as to lower dehumidifying performance of the evaporator 4 in the first embodiment. Tte should be offset to be lower so as to be higher so as to heighten the dehumidifying performance of the evaporator 4 in the second embodiment.

Moreover, the zone of RHw on the basis of the zone map is offset in accordance with Nd. Otherwise, it may be offset in accordance with frequency in use of the defroster mode switch 33d.

Further, RH is detected by the humidity sensor 37. Otherwise, RH may be detected without using the humidity sensor 37. For example, the amount of dehumidifying moisture is calculated on the basis of moving state of the compressor 18, and the amount of humidified moisture is calculated on the basis of the number of the passengers, and thereafter it is possible RH is determined on the basis of those calculated amounts. Besides, when a thermal sensor such as a dry and wet bulb hygrometer is employed, RH can be approximately precisely determined.

Furthermore, the ON/OFF state of the compressor 18 is controlled on the basis of Tte in the first embodiment. Otherwise, when employing a changeable capacity type compressor, the capacity thereof may be controlled. Moreover, when employing an electric compressor, which is driven by an electric motor, the rotation speed of the motor may be controlled.

The present invention should not be limited to the embodiments previously discussed and shown in the figures, but may be implemented in various ways without departing from the spirit of the invention.

What is claimed is:

1. A vehicle air-conditioning apparatus for a vehicle including a windshield, the vehicle air-conditioning apparatus comprising:
   dehumidification means for dehumidifying an inside of the vehicle, the dehumidification means including a compressor and switch means for activating the compressor;
   humidity calculation means for calculating humidity in the vicinity of an inside surface of the windshield;
   determination means for determining whether the windshield is fogged on the basis of a comparison, between the calculated humidity and a predetermined value in a state where the switch means is turned off; and
   means for performing a defogging operation for heightening dehumidifying performance of the dehumidification means when the determination means determines that the windshield is fogged in a state where the switch means is turned on, wherein
   either the dehumidifying performance of the dehumidification means is lowered or a humidity condition in which the defogging operation is initiated is increased for the next defogging operation, when the windshield is determined to be fogged and the defogging operation is not manually performed in the state where the switch means is turned off.

2. The vehicle air-conditioning apparatus according to claim 1, wherein either the predetermined value is heightened or the calculated humidity input to the determination means is lowered in order to delay the defogging operation.

3. The vehicle air-conditioning apparatus according to claim 1, wherein either the dehumidifying performance of the dehumidification means or the calculated humidity, in which the defogging operation is manually performed, is determined on the basis of a number of times in which the defogging operation is manually performed, when the defogging operation for defogging the windshield is not performed in a state where the windshield is determined to be fogged and the switch means is turned off.

4. The vehicle air-conditioning apparatus according to claim 1, further comprising a defroster air outlet and a heating device, wherein:
   the vehicle includes at least one of a door window and a sun roof; and
   the defogging operation is selected from the group of:
   turning on one activation switch of the switch means;
   opening the defroster air outlet;
   opening at least one of the door window and the sun roof;
   changing an air inlet mode from an inside mode, in which inside air of the vehicle is circulated in the vehicle, into an outside mode, in which outside air is introduced into the vehicle; and
   turning on the heating device.

* * * * *